US008488806B2

(12) United States Patent
Saruwatari et al.

(10) Patent No.: US 8,488,806 B2
(45) Date of Patent: Jul. 16, 2013

(54) SIGNAL PROCESSING APPARATUS

(75) Inventors: Hiroshi Saruwatari, Ikoma (JP); Yoshimitsu Mori, Gifu (JP); Hiromitsu Mori, legal representative, Gifu (JP); Eiji Baba, Osaka (JP)

(73) Assignee: National University Corporation Nara Institute of Science and Technology, Ikoma-shi (JP)

( * ) Notice: Subject to any disclaimer, the term of this patent is extended or adjusted under 35 U.S.C. 154(b) by 959 days.

(21) Appl. No.: 12/593,928

(22) PCT Filed: Mar. 26, 2008

(86) PCT No.: PCT/JP2008/055757

§ 371 (c)(1),
(2), (4) Date: Sep. 30, 2009

(87) PCT Pub. No.: WO2008/123315

PCT Pub. Date: Oct. 16, 2008

(65) Prior Publication Data

US 2010/0128897 A1 May 27, 2010

(30) Foreign Application Priority Data

Mar. 30, 2007 (JP) ................................ 2007-092067

(51) Int. Cl.
*H04B 15/00* (2006.01)

(52) U.S. Cl.
USPC ........ 381/94.1; 381/94.3; 381/94.7; 381/73.1

(58) Field of Classification Search
USPC ...... 381/56, 71.1–71.14, 73.1, 92, 94.1–94.9, 381/119; 700/94; 704/233–237
See application file for complete search history.

(56) References Cited

U.S. PATENT DOCUMENTS 7,047,189 B2 * 5/2006 Acero et al. .................. 704/222
7,243,060 B2 * 7/2007 Atlas et al. .................... 704/200

(Continued)

FOREIGN PATENT DOCUMENTS

JP 2006-154314 6/2006
JP 2007-33825 2/2007

OTHER PUBLICATIONS

"SIMO-ICA to SIMO Model ni Motozuku Kakucho Binary Mask Shori o Mochiita 2-dan Blind Ongen Bunri Shuno." Report of the 2006 Spring Meeting, The Acoustical Society of Japan (ASJ), Mar. 2006, pp. 537-538.

*Primary Examiner* — Vivian Chin
*Assistant Examiner* — Fatimat O Olaniran
(74) *Attorney, Agent, or Firm* — Oblon, Spivak, McClelland, Maier & Neustadt, L.L.P.

(57) ABSTRACT

A separation signal generation unit generates a plurality of separation signals which are independent from one another from the mixed signals for one frame which are converted into those in a frequency region. A mask processing unit judges a noise condition of a first separation signal for each frequency bin on the basis of the first separation signal and second separation signals. The mask processing unit further removes a first noise component obtained on the basis of a judgment result on the noise condition from the first separation signal. A noise amount measuring unit measures the amount of noise in the first separation signal. A noise signal selection unit selects a noise signal for each frequency bin on the basis of the amount of noise measured by the noise amount measuring unit. A noise removing unit removes a second noise component from a noise removal signal inputted from the mask processing unit. The noise removing unit outputs the noise removal signal obtained by removing the second noise component as a target signal.

9 Claims, 11 Drawing Sheets

U.S. PATENT DOCUMENTS

| | | | | |
|---|---|---|---|---|
| 7,474,756 | B2 * | 1/2009 | Rickard et al. | 381/94.7 |
| 7,562,013 | B2 * | 7/2009 | Gotanda et al. | 704/228 |
| 8,200,484 | B2 * | 6/2012 | Choi et al. | 704/228 |
| 2007/0038442 | A1 * | 2/2007 | Visser et al. | 704/233 |

* cited by examiner

SIGNAL PROCESSING APPARATUS

TECHNICAL FIELD

The present invention relates to a signal processing apparatus for reconstructing an original signal outputted from a target one out of a plurality of wave sources, as a target signal.

BACKGROUND ART

Conventionally, well known is a technique using sound source separation of blind sound source separation method according to an independent component analysis method in a frequency region on sound source signals outputted from a plurality of sound sources, to generate respective separation signals corresponding to the sound source signals from a plurality of mixed sound source signals obtained by superimposing the sound source signals (e.g., Patent Documents 1 to 3).

In a technique of the Patent Document 1, by the sound source separation of blind sound source separation method according to the independent component analysis method in a frequency region, a SIMO (Single-Input Multiple-Output) signal is generated as a plurality of separation signals for each frequency bin. Next, among the plurality of separation signals, a first separation signal corresponding to a sound source to be separated and second separation signals other than the separation signal corresponding to this sound source are compared for each frequency bin. Then, by mask processing on the basis of a result of comparison among these separation signals, a noise component is removed from the first separation signal for each frequency bin and a target signal is thereby generated.

In a technique of the Patent Document 2, by utilizing the fact that an arrival direction of the sound source signal outputted from the sound source to be separated and an arrival direction of the noise signal are different from each other, the sound source separation is performed. Specifically, after the sound source separation according to the independent component analysis method in a frequency region, a cross correlation between a separation signal of straight component corresponding to the target signal and a separation signal of cross component corresponding to an interfering sound is calculated and a coefficient for noise estimation is obtained from the amount of delay of when the cross correlation becomes the maximum. Then, on the basis of this obtained coefficient, a noise component is removed from the separation signal corresponding to the target signal.

Further, in a technique of the Patent Document 3, noise estimation and noise removal are performed on the basis of the assumption that an amplitude spectrum of the sound source signal outputted from the target sound source and that of the noise signal do not simultaneously take large values at the same time in the same frequency.

Patent Document 1: Japanese Patent Application Laid Open Gazette No. 2006-154314

Patent Document 2: Japanese Patent Gazette No. 3831220

Patent Document 3: Japanese Patent Application Laid Open Gazette No. 2005-308771

DISCLOSURE OF INVENTION

Problem to be Solved by the Invention

When any one of the techniques of the Patent Documents 1 to 3 is used outdoors to perform the sound source separation, however, the following problem arises. The outdoors has a lot of noises, like environmental sounds such as chirping of insects, sound of the rain, sound of the wind and sound of the waves and reverberations, surrounding a sound outputted from the sound source to be separated. For this reason, under such a noise condition, there sometimes arises a case where the sound source signal to be separated can not be favorably removed from the noise signal and extracted even by using the technique of the Patent Document 1.

The technique of the Patent Document 2, as discussed above, utilizes the fact that the sound source signal from the target sound source to be separated and the noise signal are outputted from different directions. For this reason, when the noise signals like the environmental sounds and reverberations surround the sound source signal outputted from the target sound source and the target sound source signal and the noise signals overlap each other, there arises a problem that it is impossible to favorably separate the sound source signal to be separated.

In the technique of the Patent Document 3, it is assumed that the sound source signal to be separated and the noise signal have great sparsity, and in other words, even if the sound source signal and the noise signal are mixed, the overlapping of these signals in the frequency region is small. For this reason, also in the technique of the Patent Document 3, like in the techniques of the Patent Documents 1 and 2, there arises a problem that it is impossible to favorably separate the sound source signal to be separated in the outdoor environment.

This problem does not necessarily arise only on a sound wave, but arises in a case where an original signal outputted from a target one out of a plurality of wave sources is reconstructed as the target signal, like an electromagnetic wave or a brain wave.

Then, it is an object of the present invention to provide a signal processing apparatus capable of favorably reconstructing a target original signal from a mixed signal obtained by mixing a plurality of original signals.

To solve the above problem, a first invention is intended for a signal processing apparatus for reconstructing an original signal outputted from a target one of a plurality of wave sources as a target signal. According to the first invention, the signal processing apparatus comprises a plurality of observation units each capable of observing a plurality of original signals outputted from the plurality of wave sources as a mixed signal of the plurality of original signals, a separation signal generation unit for generating a plurality of separation signals which are independent from one another from the mixed signals for one frame, which are observed by each of the observation units and converted into those in a frequency region, for each frequency bin in the frame, a mask processing unit for judging a noise condition of a first separation signal corresponding to the target signal out of the plurality of separation signals on the basis of the first separation signal and second separation signals other than the first separation signal out of the plurality of separation signals, generating a noise removal signal by removing a first noise component obtained on the basis of a judgment result on the noise condition from the first separation signal and generating a noise condition signal on the basis of the judgment result on the noise condition, for each frequency bin in the frame, a noise amount measuring unit for measuring the amount of noise included in the first separation signal for each the frame on the basis of the noise condition signal for each the frequency bin, which is inputted from the side of the mask processing unit, a noise signal selection unit for selecting one of the second separation signals as a noise signal for each the frequency bin on the basis of the amount of noise measured by the noise amount measuring unit, and a noise removing unit for removing a second noise component generated on the basis of the noise signal from the noise removal signal for each the frequency bin and outputting the noise removal signal obtained by removing the second noise component as the target signal.

According to a second invention, in the signal processing apparatus of the first invention, the mask processing unit judges the noise condition and generates the noise condition signal on the basis of size comparison between an amplitude spectrum of the first separation signal corresponding to the target signal and amplitude spectra of the second separation signals, and the noise amount measuring unit measures the amount of noise by counting the noise condition signals.

According to a third invention, a signal processing apparatus for reconstructing an original signal outputted from a target one of a plurality of wave sources as a target signal comprises a plurality of observation units each capable of observing a plurality of original signals outputted from the plurality of wave sources as a mixed signal of the plurality of original signals, a separation signal generation unit for generating a plurality of separation signals which are independent from one another from the mixed signals for one frame, which are observed by each of the observation units and converted into those in a frequency region, for each frequency bin in the frame, a mask processing unit for judging a noise condition of a first separation signal corresponding to the target signal out of the plurality of separation signals on the basis of the first separation signal and second separation signals other than the first separation signal out of the plurality of separation signals and generating a noise removal signal by removing a first noise component obtained on the basis of a judgment result on the noise condition from the first separation signal, for each frequency bin in the frame, a noise amount measuring unit for measuring the amount of noise included in the first separation signal for each the frame on the basis of the plurality of separation signals inputted from the separation signal generation unit, a noise signal selection unit for selecting one of the second separation signals as a noise signal for each the frequency bin on the basis of the amount of noise measured by the noise amount measuring unit, and a noise removing unit for removing a second noise component generated on the basis of the noise signal from the noise removal signal for each the frequency bin and outputting the noise removal signal obtained by removing the second noise component as the target signal.

According to a fourth invention, in the signal processing apparatus of the third invention, the noise amount measuring unit converts the first separation signal in the frequency region inputted from the separation signal generation unit into that in a time region and measures the amount of noise included in the first separation signal on the basis of a kurtosis calculated by using the converted first separation signal.

According to a fifth invention, in the signal processing apparatus of the third invention, the noise amount measuring unit measures the amount of noise included the first separation signal for each the frame on the basis of a spread condition of the second separation signals inputted from the separation signal generation unit.

According to a sixth invention, in the signal processing apparatus of the fifth invention, the spread condition is a condition of dispersion in direction of the second separation signals.

According to a seventh invention, in the signal processing apparatus of any of the first to fifth inventions, the noise removing unit generates the second noise component on the basis of the amount of noise inputted from the side of the noise amount measuring unit and the noise signal selected by the noise signal selection unit.

According to an eighth invention, in the signal processing apparatus of first or third invention, the noise removing unit calculates an amplitude spectrum of the target signal for each the frequency bin by subtracting an amplitude spectrum of the second noise component from an amplitude spectrum of the noise removal signal.

According to a ninth invention, in the signal processing apparatus of first or third invention, M original signals outputted from M wave sources are each observed by N observation units (M, N: each natural number not smaller than 2), the mask processing unit judges the noise condition on the basis of one first separation signal and $(M-1)\times N$ second separation signals, and the noise signal selection unit selects one out of the $(M-1)\times N$ second separation signals as the noise signal.

In the first to ninth inventions, the noise removal is performed by the mask processing unit and the noise removing unit in accordance with the noise condition of the first separation signal. Specifically, from the noise removal signal obtained by noise removal in the mask processing unit, the second noise component in accordance with the noise condition of the first separation signal is further removed. Therefore, even if a lot of noise signals, like the environmental sounds and the reverberations, surrounding the original signal outputted from the wave source are included, it is possible to further favorably remove the noise component.

In the first, second and seventh to ninth inventions, the noise amount measuring unit can measure the amount of noise by using the judgment result on the noise condition obtained by the mask processing unit. Therefore, it is possible to simplify the hardware structure of the noise amount measuring unit and reduce the manufacturing cost of the whole apparatus.

In the third to ninth inventions, the noise amount measuring unit can measure the amount of noise by using the separation signals outputted from the separation signal generation unit. In other words, the mask processing unit does not need to be involved in the measurement of the amount of noise. This eliminates the necessity of any operation (e.g., a synchronous operation) performed between the noise amount measuring unit and the mask processing unit and it is therefore possible to simplify the circuit configuration of the noise amount measuring unit and the mask processing unit.

Especially, in the second invention, the noise amount measuring unit can measure the amount of noise by counting the noise condition signals generated by performing size comparison between the amplitude spectrum of the first separation signal corresponding to the target signal and the amplitude spectra of the second separation signals. Therefore, it is possible to obtain the amount of noise by simple calculation and reduce the calculation cost of the noise amount measuring unit.

Especially, in the fourth invention, the noise amount measuring unit can measure the amount of noise included in the first separation signal corresponding to the target signal on the basis of the statistics (kurtosis) of the first separation signal. Therefore, it is possible to accurately grasp the noise condition of the first separation signal and favorably perform the noise removal in the noise removing unit.

Especially, in the fifth and sixth inventions, the noise amount measuring unit can quantify the noise condition of a space in which the wave sources are arranged on the basis of the spread condition of the second separation signals which include more noise components than the first separation signal includes (the condition of dispersion in direction of the second separation signals). Therefore, it is possible to accurately grasp the noise condition of the first separation signal and favorably perform the noise removal in the noise removing unit.

Especially, in the seventh invention, in the case where the second noise component is generated from the noise signal, the noise removing unit can generate the second noise component in consideration of the amount of noise generated by the noise amount measuring unit. Therefore, it is possible to further favorably remove the noise component from the noise removal signal corresponding to the target signal.

Especially, in the eighth invention, the noise removing unit can calculate the amplitude spectrum of the target signal by subtraction. Therefore, it is possible to reduce the calculation cost of the noise removing unit.

These and other objects, features, aspects and advantages of the present invention will become more apparent from the following detailed description of the present invention when taken in conjunction with the accompanying drawings.

BEST MODE FOR CARRYING OUT THE INVENTION

Hereinafter, with reference to figures, the preferred embodiments of the present invention will be discussed in detail.

1. The First Preferred Embodiment

1.1. Constitution of Signal Processing Apparatus

Figure 1:
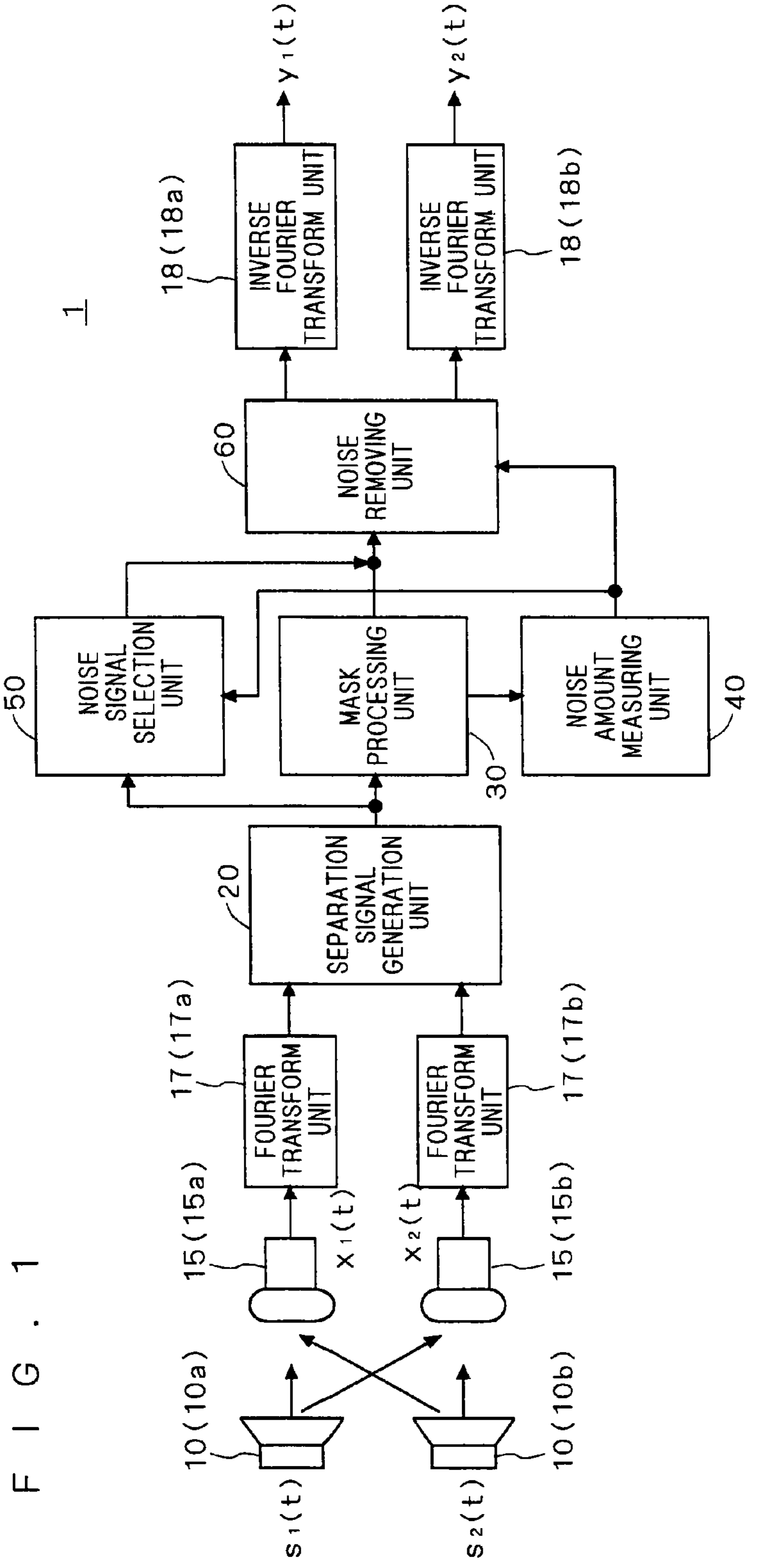
FIG. 1 is a block diagram showing an exemplary overall structure of a signal processing apparatus in accordance with a first preferred embodiment of the present invention.

FIG. 1 is a block diagram showing an exemplary overall structure of a signal processing apparatus 1 in accordance with the first preferred embodiment. Herein, the signal processing apparatus 1 is a signal processing apparatus for reconstructing an original signal outputted from a target sound source 10 out of a plurality of sound sources (wave sources) 10 (10*a*, 10*b*) as a target signal. In the signal processing apparatus 1, as a separation method, adopted is a blind sound source separation method according to a so-called independent component analysis method.

As shown in FIG. 1, the signal processing apparatus 1 mainly comprises observation units 15, a separation signal generation unit 20, a mask processing unit 30, a noise amount measuring unit 40, a noise signal selection unit 50 and a noise removing unit 60.

Each of a plurality of microphones 15 (15*a*, 15*b*) is an observation unit for observing a mixed signal of sound source signals (original signals) s1(*t*) and s2(*t*) outputted from the sound sources 10 (10*a*, 10*b*). In each of the microphones 15, the sound source signals outputted from a plurality of (two, in this preferred embodiment) sound sources 10 are superimposed.

The microphones 15*a* and 15*b* are disposed on the respective sides of the sound sources 10*a* and 10*b*. Therefore, from a mixed signal x1(*t*) in a time region received by the microphone 15*a*, a separation signal y11(*f, t*) (see FIG. 2) in a frequency region corresponding to a target signal y1(*t*) is separated according to the independent component analysis method. Similarly, from a mixed signal x2(*t*), which is received by the microphone 15*b*, a separation signal y21(*f, t*) (see FIG. 2) corresponding to a target signal y2(*t*) is separated.

Fourier transform units 17 (17*a*, 17*b*) convert the mixed signals x1(*t*) and x2(*t*) in the time region inputted from the microphones 15 (15*a*, 15*b*) into mixed signals x1(*f, t*) and x2(*f, t*) in the frequency region. In the first preferred embodiment, the mixed signals x1(*t*) and x2(*t*) within a predetermined time are defined as a frame and discrete Fourier transform (DFT) is performed for each frame. As a calculation algorithm of the discrete Fourier transform, fast Fourier transform (FFT) is used.

Figure 2:
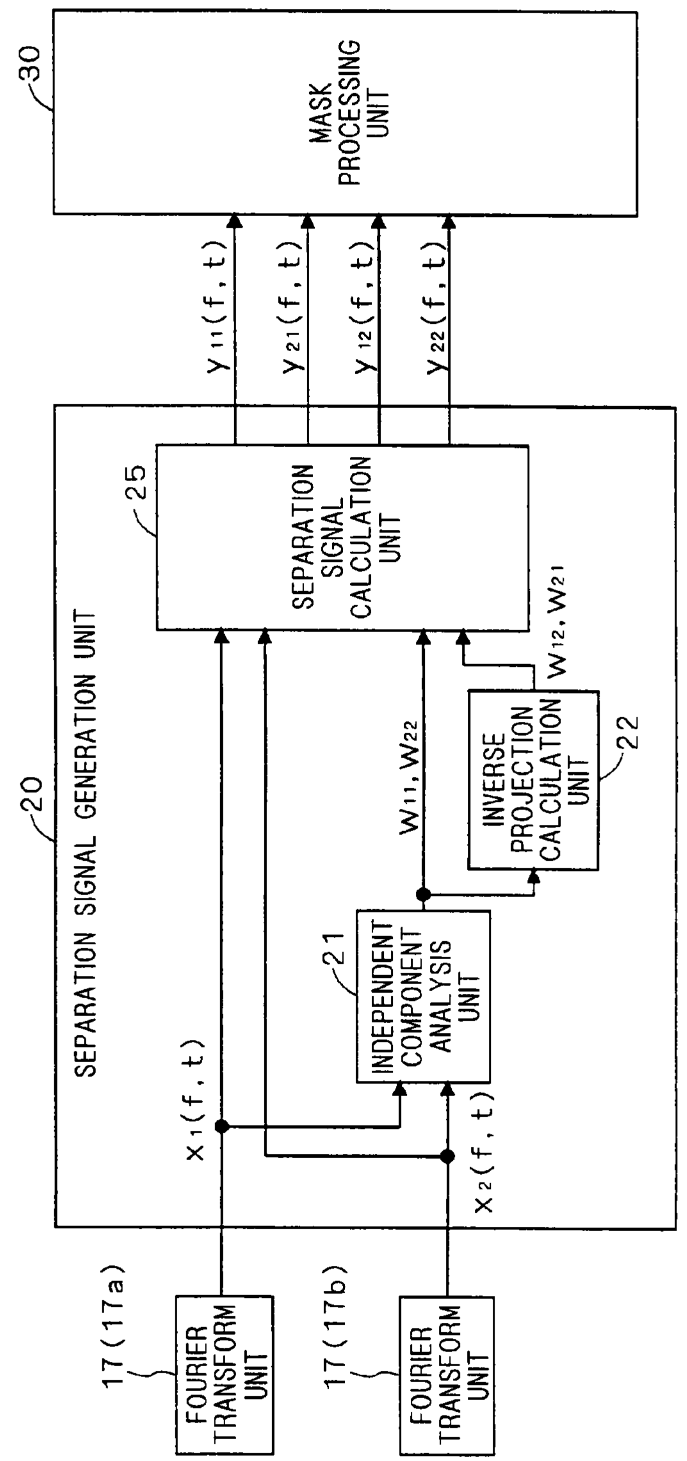
FIG. 2 is a block diagram showing an exemplary structure of a separation signal generation unit in accordance with first to third preferred embodiments.

FIG. 2 is a block diagram showing an exemplary structure of the separation signal generation unit 20. The separation signal generation unit 20 generates a plurality of (four, in this preferred embodiment) separation signals which are independent from one another from the mixed signals x1(*f, t*) and x2(*f, t*) for one frame which are observed by the respective microphones 15 and converted into those in the frequency region by the corresponding Fourier transform units 17. As shown in FIG. 2 the separation signal generation unit 20 mainly has an independent component analysis unit 21, an inverse projection calculation unit 22 and a separation signal calculation unit 25.

Herein, these separation signals are generated for each frequency bin (frequency band of specific width) in the frame. In the first preferred embodiment, though each frame is divided into 1024 frequency bins, the number of frequency bin in each frame is not limited to this but may be increased or decreased as necessary.

The independent component analysis unit 21 obtains separation matrices (w11, w22) used in the independent component analysis method in the frequency region. As shown in Eqs. 1 and 2, these coefficients w11 and w22 are used for calculation of the separation signals y11(*f, t*) and y21(*f, t*) corresponding to the sound sources 10*a* and 10*b* from the mixed signals x1(*f, t*) and x2(*f, t*) on the basis of the two microphones 15*a* and 15*b*.

$$y_1^{ICA1}(f,t)=w_{11}(f)\cdot x_1(f,t) \quad \text{(Eq. 1)}$$

$$y_2^{ICA1}(f,t)=w_{22}(f)\cdot x_2(f,t) \quad \text{(Eq. 2)}$$

In the independent component analysis unit 21, as a learning algorithm for obtaining the coefficients w11 and w22, used is, for example, a fast algorithm (unsupervised adaptive algorithm based on minimization of Kullback-Leibler divergence) invented by Amari.

The inverse projection calculation unit 22 calculates inverse projection of the separation matrices (w11, w22) learned by the independent component analysis unit 21, to obtain separation matrices (w12, w21). As shown in Eqs. 3 and 4, these coefficients w12 and w21 are used for calculation of signal components (separation signals y22(*f, t*) and y12(*f, t*)) on diagonal lines of the two microphones 15*a* and 15*b* from the mixed signals x1(*f, t*) and x2(*f, t*).

$$Y_1^{ICA2}(f,t)=w_{12}(f)\cdot x_2(f,t) \quad \text{(Eq. 3)}$$

$$Y_2^{ICA2}(f,t)=w_{21}(f)\cdot x_1(f,t) \quad \text{(Eq. 4)}$$

Herein, the signal components on the diagonal lines refer to a sound source signal (to which the separation signal y22(*f, t*) corresponds) which is outputted from the sound source 10*b* and observed by the microphone 15*a* and a sound source signal (to which the separation signal y12(*f, t*) corresponds) which is outputted from the sound source 10*a* and observed by the microphone 15*b*.

The separation signal calculation unit 25 calculates the separation signals y11(*f, t*), y12(*f, t*), y21(*f, t*) and y22(*f, t*) by substituting the separation matrices (w11, w21, w12, w22) obtained by the independent component analysis unit 21 and the inverse projection calculation unit 22 and the mixed signals x1(*f, t*) and x2(*f, t*) inputted from the microphones 15*a* and 15*b* into Eqs. 1 to 4.

Thus, in the separation signal generation unit 20 of the first preferred embodiment, by the independent component analysis method based on a SIMO (Single-Input Multiple-Output) model, the separation signals y11(*f, t*), y12(*f, t*), y21(*f, t*) and y22(*f, t*) are obtained.

Figure 3:
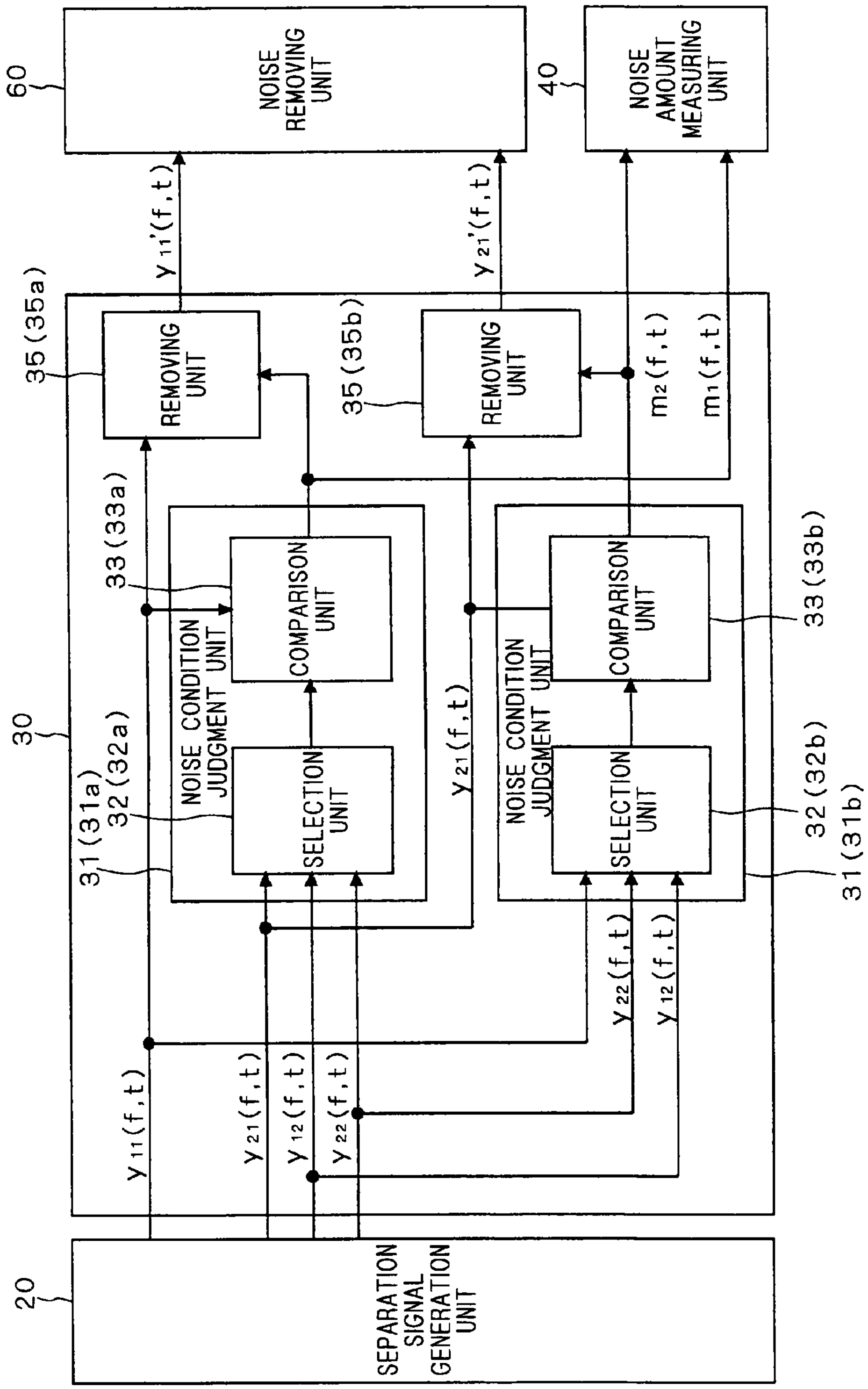
FIG. 3 is a block diagram showing an exemplary structure of a mask processing unit in accordance with the first to third preferred embodiments.
Figure 4:
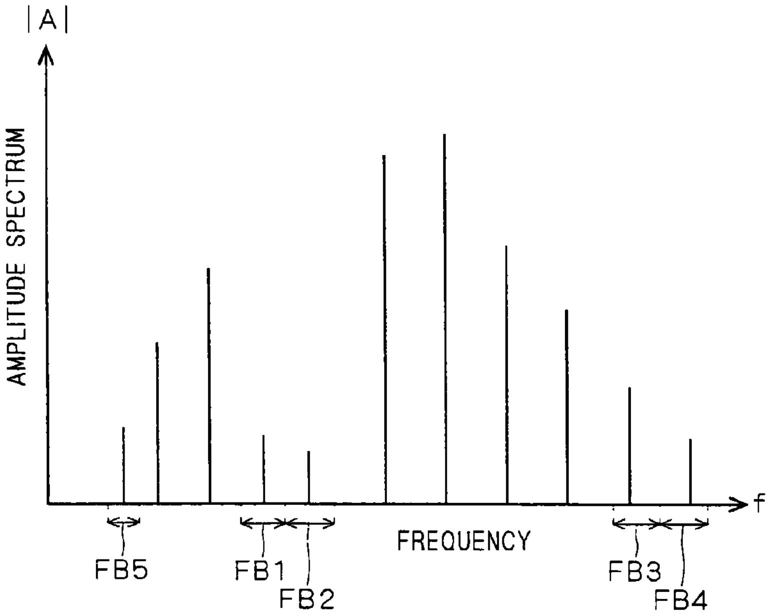
FIG. 4 is a view showing a method of removing a first noise component performed by the mask processing unit.
Figure 5:
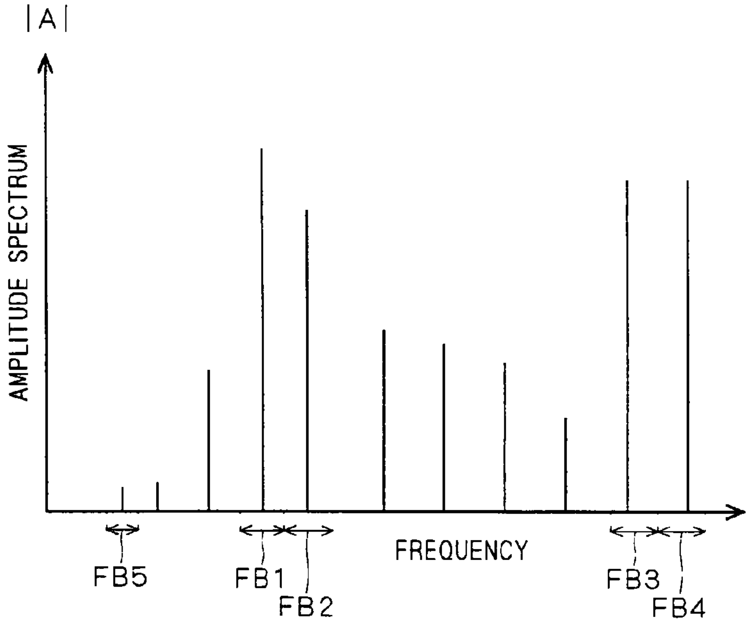
FIG. 5 is a view showing the method of removing the first noise component performed by the mask processing unit.
Figure 6:
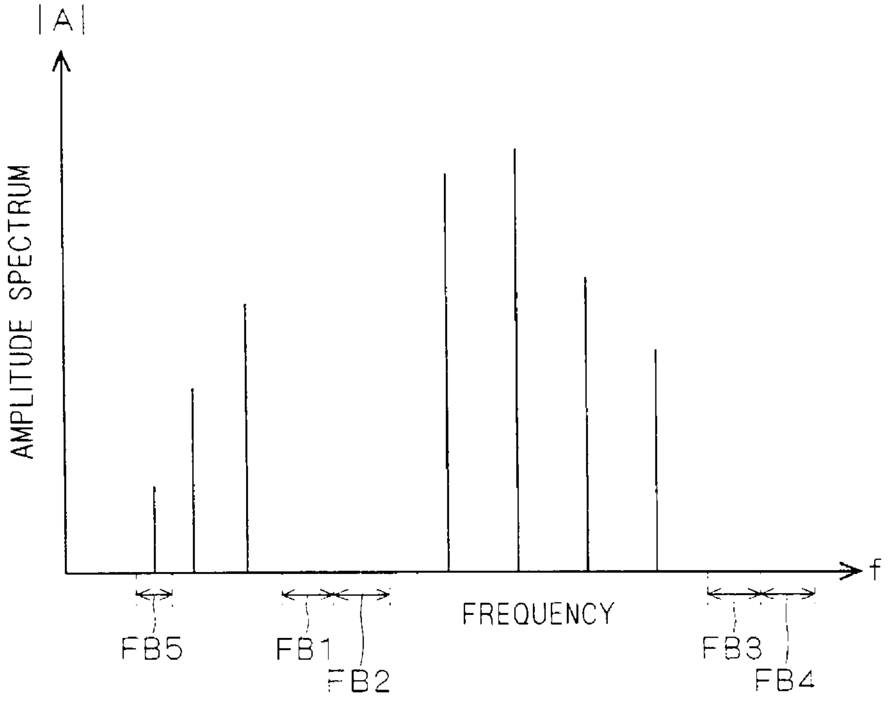
FIG. 6 is a view showing the method of removing the first noise component performed by the mask processing unit.

FIG. 3 is a block diagram showing an exemplary structure of the mask processing unit 30. FIGS. 4 to 6 are views each showing a method of removing a noise component (first noise component) performed by the mask processing unit 30. The mask processing unit 30 judges a noise condition of the first separation signal on the basis of the separation signal corresponding to the target signal (hereinafter, referred to also as "first separation signal") out of a plurality of separation signals y11(*f, t*), y12(*f, t*), y21(*f, t*) and y22(*f, t*) inputted from the separation signal generation unit 20 and the separation signals other than the first separation signal (hereinafter, referred to also as "second separation signal") out of the plurality of separation signals (noise condition judgment units 31 perform this operation).

The mask processing unit 30 further removes the noise component (first noise component) obtained on the basis of the judgment result on the noise condition from the first separation signal, to generate a noise removal signal (removing units 35 perform this operation).

As shown in FIG. 3, the mask processing unit 30 mainly has the noise condition judgment units 31 and the removing units 35.

The noise condition judgment units 31 (31*a*, 31*b*) judge a condition of noise included in the target signal on the basis of the separation signals from the separation signal generation unit 20. Herein, to the noise condition judgment unit 31*a* for judging the noise condition of the first separation signal y11(*f, t*) corresponding to the target signal y1(*t*), the separation signals y21(*f, t*), y12(*f, t*) and y22(*f, t*) are inputted as the second separation signals. On the other hand, to the noise condition judgment unit 31*b* for judging the noise condition of the first separation signal y21(*f, t*) corresponding to the target signal y2(*t*), the separation signals y11(*f, t*), y22(*f, t*) and y12(*f, t*) are inputted as the second separation signals.

A selection unit 32 (32*a*, 32*b*) of each of the noise condition judgment units 31 compares the respective absolute values of the amplitude spectra of the inputted second separation signals and selects one of the second separation signals which has the largest absolute value.

A comparison unit 33 (33*a*, 33*b*) compares the respective absolute values of the amplitude spectra of the first separation signal corresponding to the target signal and the second separation signal selected by the selection unit 32 for each frequency bin.

If the absolute value of the amplitude spectrum of the first separation signal is larger than the absolute value of the amplitude spectrum of the second separation signal (see the frequency bin FB5 in FIGS. 4 and 5), the comparison unit 33 (33*a*, 33*b*) judges that a signal component of the first separation signal does not correspond to the noise component (first noise component). Then, the comparison units 33*a* and 33*b* generate "1" as noise condition signals m1(*f, t*) and m2(*f, t*).

On the other hand, if the absolute value of the amplitude spectrum of the first separation signal is not larger than the absolute value of the amplitude spectrum of the second separation signal (see the frequency bins FB1 to FB4 in FIGS. 4 and 5), the comparison unit 33 (33*a*, 33*b*) judges that the signal component of the first separation signal corresponds to the noise component. Then, the comparison units 33*a* and 33*b* generates "0" as noise condition signals m1(*f, t*) and m2(*f, t*).

The removing units 35 (35*a*, 35*b*) perform noise removal on the basis of the corresponding the noise condition signals m1(*f, t*) and m2(*f, t*). Specifically, if the noise condition signal m1(*f, t*) is "0", the removing unit 35*a* removes the signal component (first noise component) in the frequency bin corresponding to the noise condition signal m1(*f, t*) from the first separation signal (see the frequency bins FB1 to FB4 in FIG. 6). Then, the removing unit 35*a* outputs a noise removal signal y11'(*f, t*) which is obtained by removing the first noise component.

On the other hand, if the noise condition signal m1(*f, t*) is "1", the removing unit 35*a* does not remove the signal component in the frequency bin corresponding to the noise condition signal m1(*f, t*) (see the frequency bin FB5 in FIG. 6). Then, the removing unit 35*a* outputs the separation signal y11(*f, t*) as the noise removal signal y11'(*f, t*).

The removing unit 35*b* also performs the same operation as that of the removing unit 35*a*, to remove the noise component on the basis of the noise condition signal m2(*f, t*) and outputs a noise removal signal y21'(*f, t*).

Figure 7:
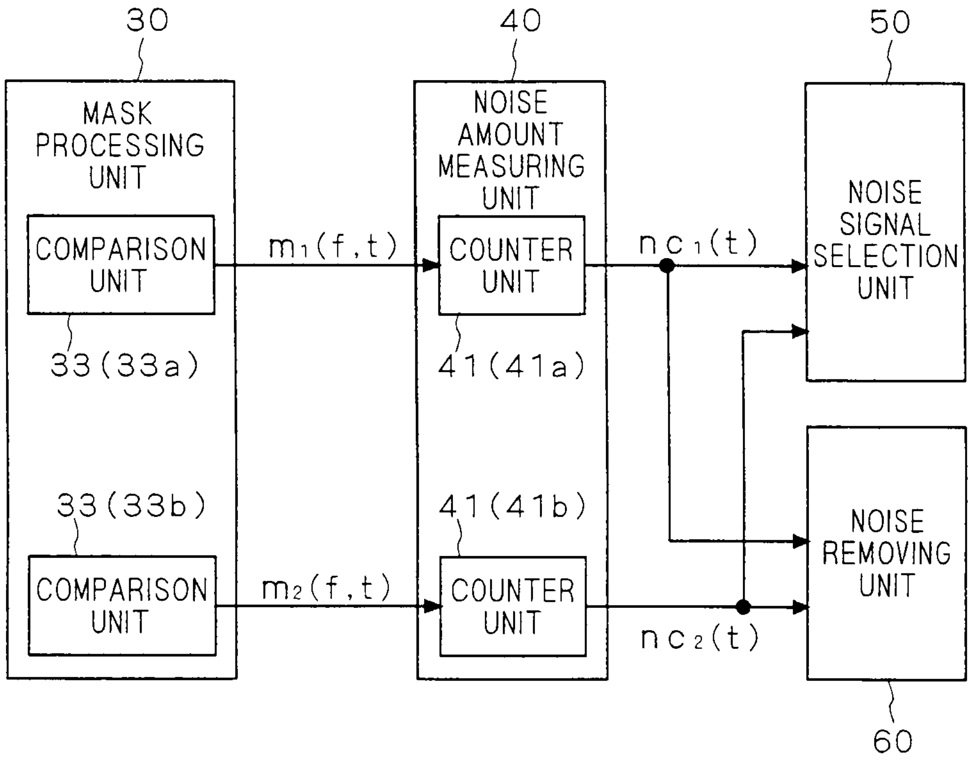
FIG. 7 is a block diagram showing an exemplary structure of a noise amount measuring unit in accordance with the first preferred embodiment.

FIG. 7 is a block diagram showing an exemplary structure of the noise amount measuring unit 40 in accordance with the first preferred embodiment. The noise amount measuring unit 40 measures the amount of noise included in the first separation signal for each frame on the basis of the noise condition signals m1(*f, t*) and m2(*f, t*) for each frequency bin which are inputted from the side of the mask processing unit 30. As shown in FIG. 7, the noise amount measuring unit 40 mainly has counter units 41 (41*a*, 41*b*).

The counter units 41 (41*a*, 41*b*) count the noise condition signals outputted from the corresponding comparison units 33 (33*a*, 33*b*) and output the count results as the noise amounts nc1(*t*) and nc2(*t*), respectively. Thus, the noise amount measuring unit 40 can obtain the noise amounts nc1 (*t*) and nc2(*t*) by simple calculation. Therefore, it is possible to reduce the calculation cost of the noise amount measuring unit 40.

Figure 8:
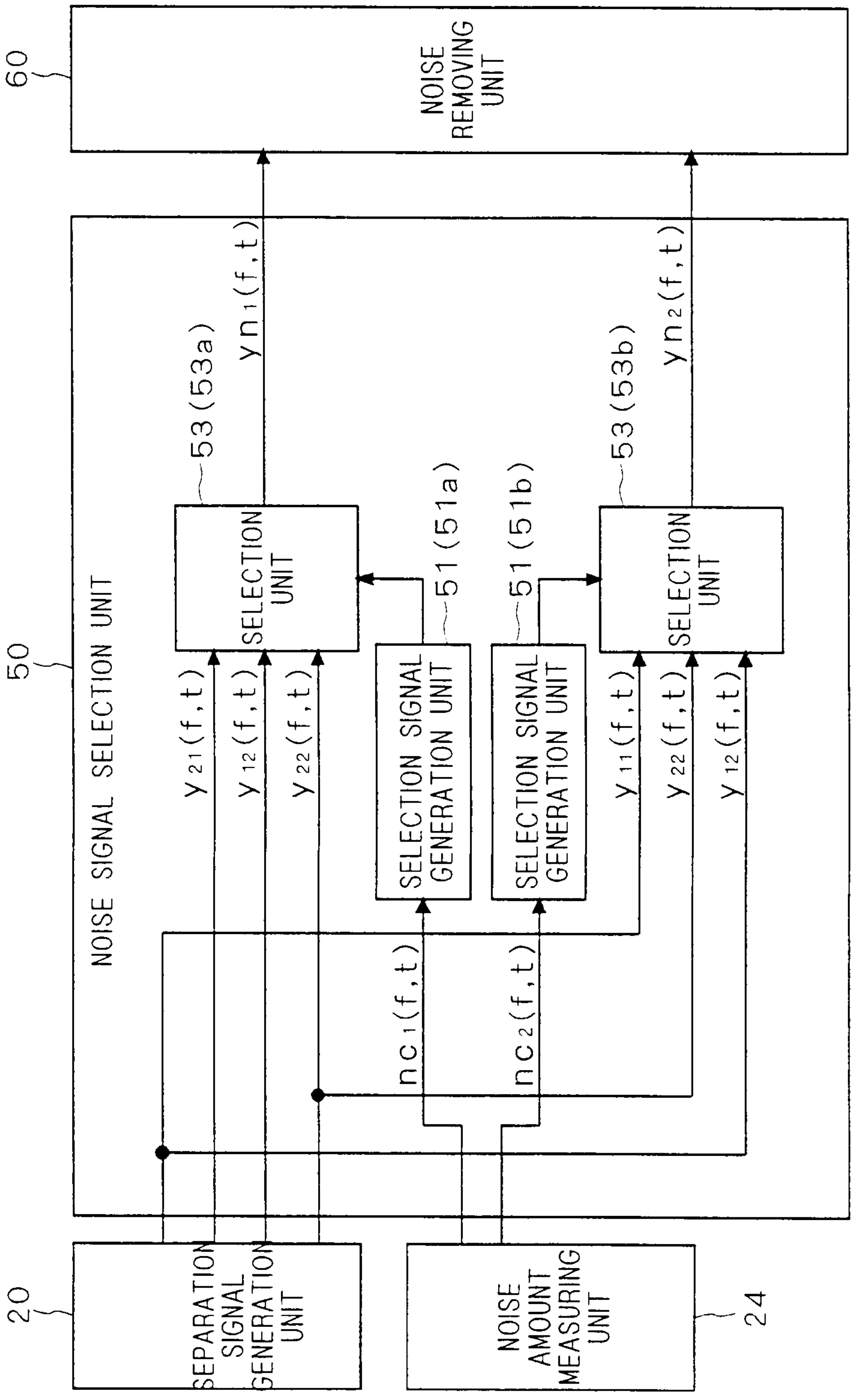
FIG. 8 is a block diagram showing an exemplary structure of a noise signal selection unit in accordance with the first to third preferred embodiments.

FIG. 8 is a block diagram showing an exemplary structure of the noise signal selection unit 50. The noise signal selection unit 50 selects noise signals for each frequency bin on the basis of the noise amounts nc1(*t*) and nc2(*t*) counted by the noise amount measuring unit 40. As shown in FIG. 8, the noise signal selection unit 50 mainly has selection signal generation units 51 (51*a*, 51*b*) and selection units 53 (53*a*, 53*b*).

The selection signal generation unit 51*a* generates a selection signal to be used for selection of the noise signal to be removed from the noise removal signal y11'(*f*, *t*) corresponding to the sound source signal (target signal) from the sound source 10*a* for each frequency bin.

Specifically, with respect to the noise amount nc1(*t*) inputted to the selection signal generation unit 51*a*, if the noise amount nc1(*t*)<a threshold value Th10, the selection signal generation unit 51*a* judges that overlapping of the sound source signal outputted from the target sound source 10*a* and the noise signal is small in the noise removal signal y11'(*f*, *t*). Then, the selection signal generation unit 51*a* generates a selection signal for selecting a signal component on the diagonal line of the microphone 15*b* (i.e., the separation signal y12(*f*, *t*) corresponding to the sound source 10*a*, which is received by the microphone 15*b*) as a noise signal yn1(*f*, *t*).

Herein, the separation signal y12(*f*, *t*) selected by this selection signal includes the same signal as the noise removal signal y11'(*f*, *t*) corresponding to the target signal. Therefore, if the signal corresponding to the target signal is the separation signal y11(*f*, *t*) (the noise removal signal y11'(*f*, *t*)), the amount of noise included in the separation signal y12(*f*, *t*) is smaller than that of any other second separation signal (separation signal y22(*f*, *t*), y21(*f*, *t*)).

If the threshold value Th10≦the noise amount nc1(*t*)<a threshold value Th11, the selection signal generation unit 51*a* judges that overlapping of the sound source signal of the target sound source 10*a* and the noise signal is medium. Then, the selection signal generation unit 51*a* generates a selection signal for selecting a signal component on the diagonal line of the microphone 15*a* (i.e., the separation signal y22(*f*, *t*) corresponding to the sound source 10*b*, which is received by the microphone 15*a*) as the noise signal yn1(*f*, *t*).

Herein, the separation signal y22(*f*, *t*) selected by this selection signal is a signal which corresponds to the target signal from the sound source 10*b* and also corresponds to the separation signal y21(*f*, *t*). The separation signal y22(*f*, *t*) is the signal component on the diagonal line of the microphone 15*a* and has an absolute value of the amplitude spectrum which is smaller than that of the separation signal y21(*f*, *t*). Therefore, if the signal corresponding to the target signal is the separation signal y11(*f*, *t*), the amount of noise included in the separation signal y22(*f*, *t*) is medium as compared with any other second separation signal (separation signal y12(*f*, *t*), y21(*f*, *t*)).

If the threshold value Th11≦the noise amount nc1(*t*), the selection signal generation unit 51*a* judges that overlapping of the sound source signal of the target sound source 10*a* and the noise signal is large. Then, the selection signal generation unit 51*a* generates selects the separation signal y21(*f*, *t*) corresponding to the target signal from the microphone 15*b* as the noise signal yn1(*f*, *t*).

Herein, the selected separation signal y21(*f*, *t*) corresponds to the target signal from the sound source 10*b*. Therefore, if the signal corresponding to the target signal is the separation signal y11(*f*, *t*), the amount of noise included in the separation signal y22(*f*, *t*) is larger than any other second separation signal (separation signal y12(*f*, *t*), y22(*f*, *t*)).

Thus, the selection unit 53*a* selects one of the separation signals y21(*f*, *t*), y12(*f*, *t*) and y22(*f*, *t*) which are inputted as the second separation signals from the side of the separation signal generation unit 20, as the noise signal yn1(*f*, *t*) for each frequency bin on the basis of the selection signal inputted from the side of the selection signal generation unit 51*a*. Then, the selected noise signal yn1(*f*, *t*) is outputted to the side of the noise removing unit 60.

Specifically, the selection unit 53*a* can select one separation signal of the second separation signals as the noise signal yn1(*f*, *t*) on the basis of the noise amount nc1(*t*). If the noise amount nc1(*t*) is small, for example, a noise signal including a small amount of noise with respect to the target signal is selected. Therefore, it is possible to suppress degradation of the target signal due to the removal operation performed by the noise removing unit 60.

The selection signal generation unit 51*b* generates a selection signal to be used for selection of the noise signal to be removed from the noise removal signal y21'(*f*, *t*) corresponding to the sound source signal (target signal) from the sound source 10*b* for each frequency bin.

Specifically, with respect to the noise amount nc2(*t*) inputted to the selection signal generation unit 51*b*, if the noise amount nc2(*t*)<a threshold value Th20, the selection signal generation unit 51*b* judges that overlapping of the sound source signal outputted from the target sound source 10*b* and the noise signal is small in the noise removal signal y21'(*f*, *t*). Then, the selection signal generation unit 51*b* generates a selection signal for selecting a signal component on the diagonal line of the microphone 15*a* (i.e., the separation signal y22(*f*, *t*) corresponding to the sound source 10*b*, which is received by the microphone 15*a*) as a noise signal yn2(*f*, *t*). Herein, the separation signal y22(*f*, *t*) selected by this selection signal includes the same signal as the noise removal signal y21'(*f*, *t*) corresponding to the target signal. Therefore, if the signal corresponding to the target signal is the noise removal signal y11'(*f*, *t*) (the separation signal y11(*f*, *t*)), the amount of noise included in the separation signal y22(*f*, *t*) is smaller than that of any other second separation signal (separation signal y22(*f*, *t*), y11(*f*, *t*)).

If the threshold value Th20 the noise amount nc2(*t*)<a threshold value Th21, the selection signal generation unit 51*b* judges that overlapping of the sound source signal of the target sound source 10*b* and the noise signal is medium. Then, the selection signal generation unit 51*b* generates a selection signal for selecting a signal component on the diagonal line of the microphone 15*b* (i.e., the separation signal y12(*f*, *t*) corresponding to the sound source 10*a*, which is received by the microphone 15*b*) as the noise signal yn2(*f*, *t*).

Herein, the separation signal y12(*f*, *t*) selected by this selection signal is a signal which corresponds to the target signal from the sound source 10*a* and also corresponds to the separation signal y11(*f*, *t*). The separation signal y12(*f*, *t*) is the signal component on the diagonal line of the microphone 15*b* and has an absolute value of the amplitude spectrum which is smaller than that of the separation signal y11(*f*, *t*). Therefore, if the signal corresponding to the target signal is the separation signal y21(*f*, *t*), the amount of noise included in the separation signal $y\mathbf{12}(f, t)$ is medium as compared with any other second separation signal (separation signal $y\mathbf{11}(f, t)$, $y\mathbf{22}(f, t)$).

If the threshold value Th21≦the noise amount nc2(*t*), the selection signal generation unit 51*b* judges that overlapping of the sound source signal of the target sound source 10*b* and the noise signal is large. Then, the selection signal generation unit 51*b* generates selects the separation signal $y\mathbf{11}(f, t)$ corresponding to the target signal from the microphone 15*a* as the noise signal $yn\mathbf{2}(f, t)$.

Herein, the selected separation signal $y\mathbf{11}(f, t)$ corresponds to the target signal from the sound source 10*a*. Therefore, if the signal corresponding to the target signal is the separation signal $y\mathbf{21}(f, t)$, the amount of noise included in the separation signal $y\mathbf{11}(f, t)$ is larger than any other second separation signal (separation signal $y\mathbf{12}(f, t)$, $y\mathbf{22}(f, t)$).

Thus, the selection unit 53*b* selects one of the separation signals $y\mathbf{11}(f, t)$, $y\mathbf{12}(f, t)$ and $y\mathbf{22}(f, t)$ which are inputted as the second separation signals from the side of the separation signal generation unit 20, as the noise signal $yn\mathbf{2}(f, t)$ for each frequency bin on the basis of the selection signal inputted from the side of the selection signal generation unit 51*b*. Then, the selected noise signal $yn\mathbf{2}(f, t)$ is outputted to the side of the noise removing unit 60.

Specifically, the selection unit 53*b* can select one separation signal of the second separation signals as the noise signal $yn\mathbf{2}(f, t)$ on the basis of the noise amount nc2(*t*). If the noise amount nc2(*t*) is small, for example, a noise signal including a small amount of noise with respect to the target signal is selected. Therefore, it is possible to suppress degradation of the target signal due to the removal operation performed by the noise removing unit 60.

Figure 9:
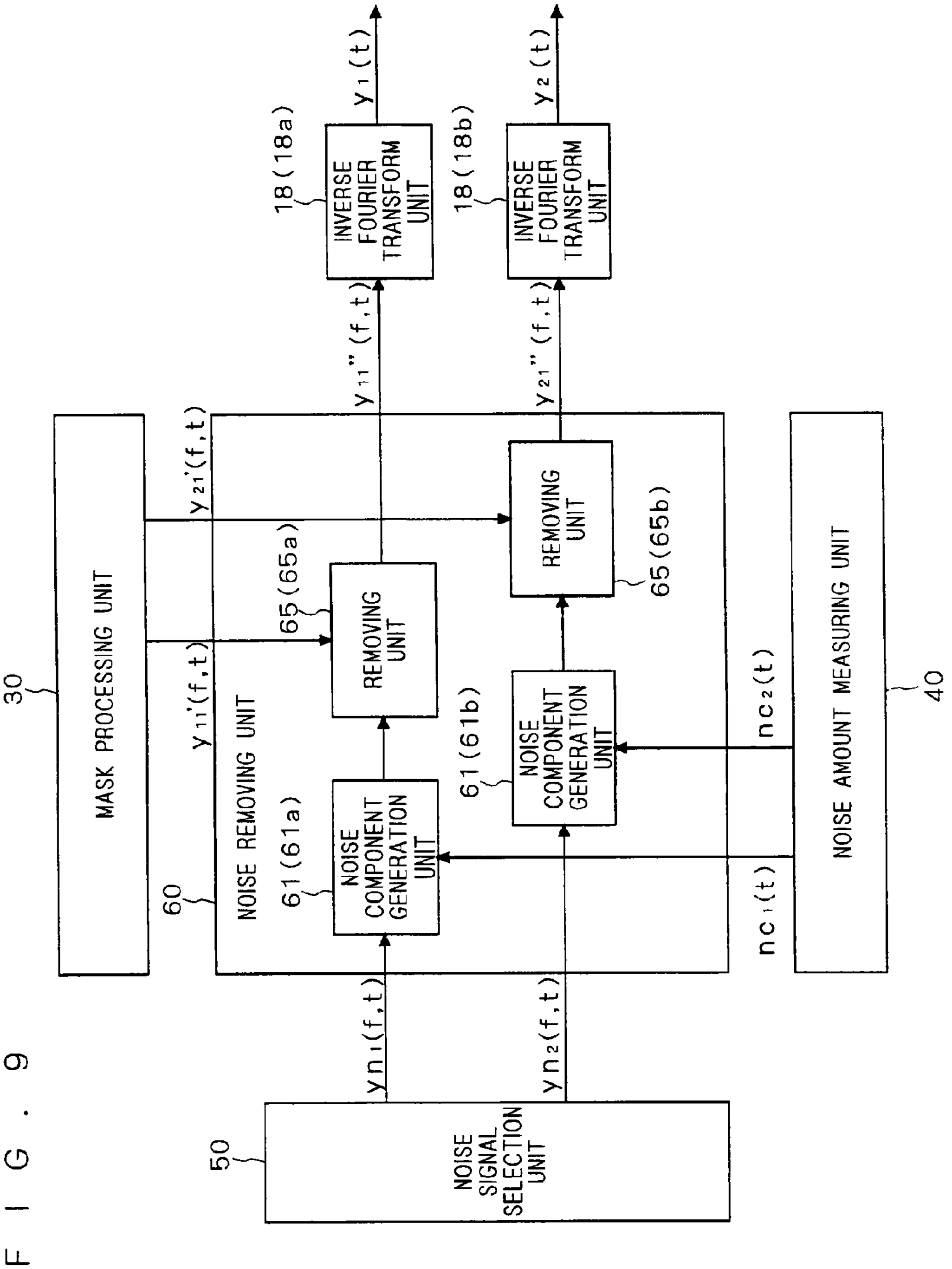
FIG. 9 is a block diagram showing an exemplary structure of a noise removing unit in accordance with the first to third preferred embodiments.

FIG. 9 is a block diagram showing an exemplary structure of the noise removing unit 60. The noise removing unit 60 removes the noise component (second noise component) from the noise removal signals $y\mathbf{11}'(f, t)$ and $y\mathbf{21}'(f, t)$ inputted from the mask processing unit 30 for each frequency bin. The noise removing unit 60 further outputs noise removal signals $y\mathbf{11}''(f, t)$ and $y\mathbf{21}''(f, t)$ obtained by removing the second noise component to the side of the inverse Fourier transform units 18 (18*a*, 18*b*) as the target signal, respectively.

As shown in FIG. 9, the noise removing unit 60 mainly has noise component generation units 61 (61*a*, 61*b*) and removing units 65 (65*a*, 65*b*).

Since the noise component generation units 61*a* and 61*b* perform the same operation, discussion will be made below only on an operation performed by the noise component generation unit 61*a*. Further, since the removing units 65*a* and 65*b* perform the same operation, discussion will be made below only on an operation performed by the removing unit 65*a*.

The noise component generation unit 61*a* generates the second noise component for each frequency bin on the basis of the noise signal $yn\mathbf{1}(f, t)$ selected by the side of the noise signal selection unit 50 and the noise amount nc1(*t*) inputted from the side of the noise amount measuring unit 40.

In the first preferred embodiment, the second noise component is obtained by performing linear transformation of the noise amount nc1(*t*) (for example, transforming the noise amount nc1(*t*) according to a look-up table, performing logarithmic transformation of the noise amount nc1(*t*) or the like) and multiplying the transformed noise amount nc1(*t*) by the noise signal $yn\mathbf{1}(f, t)$. For the linear transformation, parameters and the like required therefor are determined in advance by experiment or the like.

Thus, the noise component generation unit 61*a* of the noise removing unit 60 can generate the second noise component in consideration of even the noise amount nc1(*t*) generated by the noise amount measuring unit 40. Therefore, it is possible to further favorably remove the noise component from the noise signal $yn\mathbf{1}(f, t)$ corresponding to the target signal.

The removing unit 65*a* obtains the amplitude spectrum of the signal corresponding to the target signal by subtracting the absolute value of the amplitude spectrum of the second noise component from the absolute value of the amplitude spectrum of the noise removal signal $y\mathbf{11}'(f, t)$. The removing unit 65*a* further detects a phase angle of the noise removal signal $y\mathbf{11}'(f, t)$. Then, the removing unit 65*a* generates the noise removal signal $y\mathbf{11}''(f, t)$ on the basis of the obtained amplitude spectrum and the phase angle.

Thus, the removing unit 65*a* of the noise removing unit 60 can calculate the amplitude spectrum of the target signal by subtraction. Therefore, it is possible to reduce the calculation cost of the removing unit 65*a*.

The noise component generation unit 61*b* calculates the second noise component on the basis of the noise amount nc2(*t*) and the noise signal $yn\mathbf{2}(f, t)$ by the same operation as that in the removing unit 65*a*. The removing unit 65*b* further calculates the amplitude spectrum of the noise removal signal $y\mathbf{21}''(f, t)$ by subtracting the absolute value of the amplitude spectrum of the second noise component from the absolute value of the amplitude spectrum of the noise removal signal $y\mathbf{21}'(f, t)$.

The inverse Fourier transform units 18 (18*a*, 18*b*) convert the noise removal signals $y\mathbf{11}''(f, t)$ and $y\mathbf{21}''(f, t)$ in the frequency region which are outputted from the removing units 65*a* and 65*b* of the noise removing unit 60 into the target signals y1(*t*) and y2(*t*) in the time region, respectively.

1.2. Advantages of Signal Processing Apparatus of The First Preferred Embodiment Thus, in the signal processing apparatus 1 of the first preferred embodiment, in accordance with the noise condition of the first separation signal, the mask processing unit 30 and the noise removing unit 60 perform the noise removal. Specifically, from the noise removal signal $y\mathbf{11}'(f, t)$ and $y\mathbf{21}'(f, t)$ obtained by the noise removal in the mask processing unit 30, the second noise component in accordance with the noise condition of the first separation signal is further removed. Therefore, even if a lot of noise signals, like the environmental sounds and the reverberations, surrounding an original signal outputted from a wave source are included, it is possible to further favorably remove the noise component from the first separation signal obtained by the removal in the mask processing unit 30.

Further, the noise amount measuring unit 40 of the first preferred embodiment can measure the noise amounts nc1(*t*) and nc2(*t*) by using the judgment result on the noise condition which is obtained by the mask processing unit 30. Therefore, it is possible to simplify the hardware structure of the noise amount measuring unit 40 and reduce the manufacturing cost of the whole apparatus.

2. The Second Preferred Embodiment

Next, discussion will be made on the second preferred embodiment of the present invention. A signal processing apparatus 100 of the second preferred embodiment is the same as that of the first preferred embodiment except that the constitution of a noise amount measuring unit 140 is different from that of the first preferred embodiment. Then, the following discussion will focus on this difference. In the following discussion, the constituent elements identical to those in the signal processing apparatus 1 of the first preferred embodiment are represented by the same reference signs. In the second preferred embodiment, discussion on the constituent elements represented by the same reference signs will be omitted as it has been made in the first preferred embodiment.

2.1. Constitution of Signal Processing Apparatus

Figure 10:
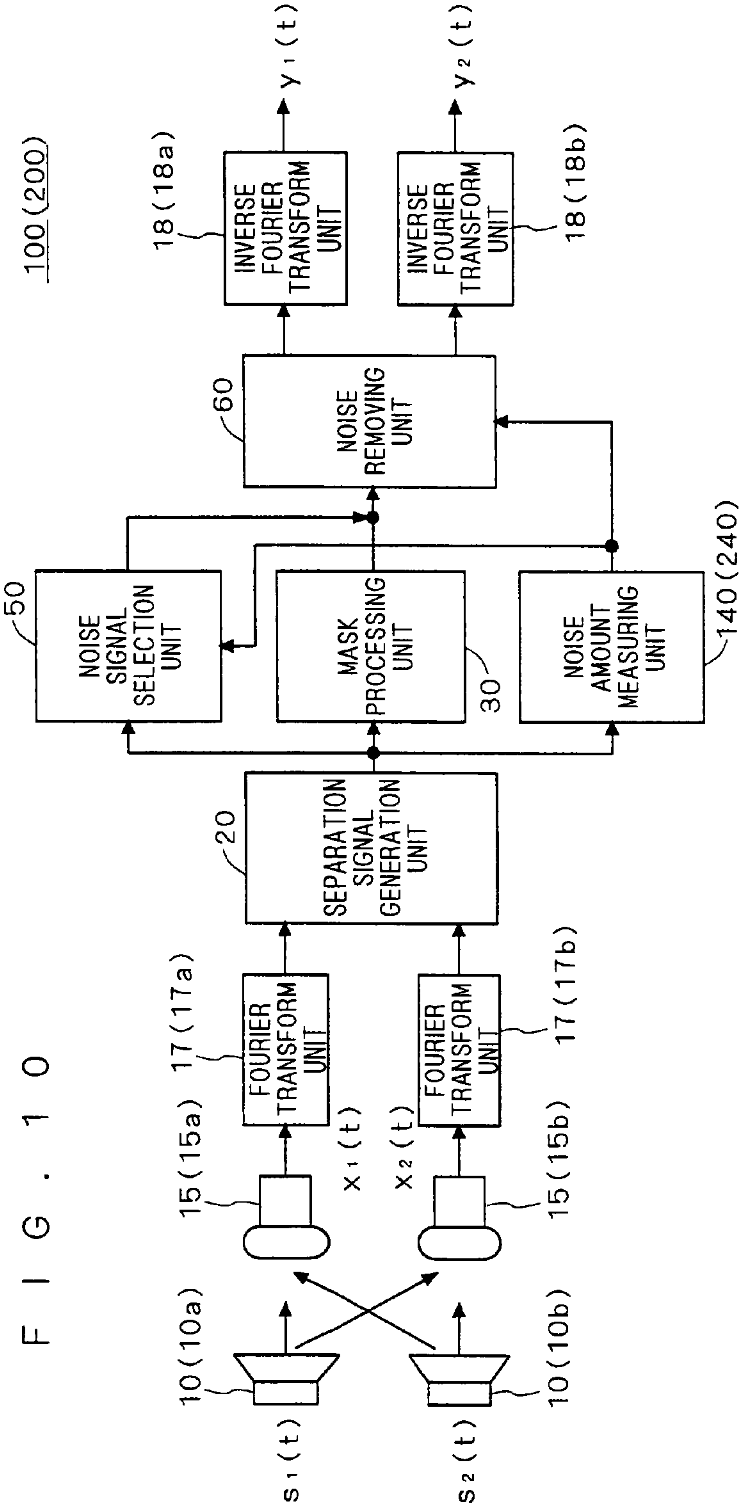
FIG. 10 is a block diagram showing an exemplary structure of a signal processing apparatus in accordance with the second and third preferred embodiments.
Figure 11:
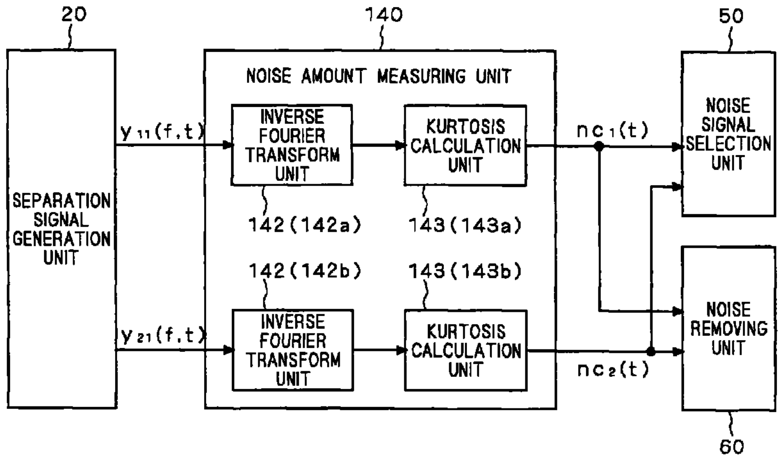
FIG. 11 is a block diagram showing an exemplary structure of a noise amount measuring unit in accordance with the second preferred embodiment.

FIG. 10 is a block diagram showing an exemplary structure of signal processing apparatuses 100 and 200 in accordance with the second and third preferred embodiments. FIG. 11 is a block diagram showing an exemplary structure of a noise amount measuring unit 140 in accordance with the second preferred embodiment. The noise amount measuring unit 140 converts the first separation signals y11(*f, t*) and y21(*f, t*) in the frequency region which are inputted from the separation signal generation unit 20 into those in the time region and measures the amounts nc1(*t*) and nc2(*t*) of noises included in the first separation signals y11(*f, t*) and y21(*f, t*), respectively, on the basis of a kurtosis β2 calculated by using the converted first separation signals. As shown in FIG. 11, the noise amount measuring unit 140 mainly has inverse Fourier transform units 142 (142*a*, 142*b*) and kurtosis calculation units 143 (143*a*, 143*b*).

The inverse Fourier transform units 142 (142*a*, 142*b*) are calculation units each having the same hardware structure as that of the inverse Fourier transform unit 18. The inverse Fourier transform unit 142*a* converts the inputted first separation signal y11(*f, t*) in the frequency region into a signal in the time region. The inverse Fourier transform unit 142*b* converts the inputted first separation signal y21(*f, t*) in the frequency region into a signal in the time region.

The kurtosis calculation units 143 (143*a*, 143*b*) calculates the kurtosis 132 on the basis of the first separation signals in the time region, after being subjected to the inverse Fourier transformation. In the second preferred embodiment, the kurtosis 132 is used as the noise amounts nc1(*t*) and nc2(*t*).

Assuming that the first separation signals in the time region corresponding to the separation signals y11(*f, t*) and y21(*f, t*) in the frequency region are separation signals y11(*t*) and y21(*t*), the standard deviation of the first separation signals y11(*t*) and y21(*t*) is σ, the average value thereof is yave and the fourth-order moment is μ4, the kurtosis β2 is expressed by Eqs. 5 and 6:

$$\beta_2 = \left(\frac{\mu_4}{\sigma^4}\right) - 3 \quad \text{(Eq. 5)}$$

$$\mu_4 = \frac{1}{n}\sum_{t=0}^{n-1}[y_{k1}(t) - y_{ave}]^4 \quad \text{(Eq. 6)}$$

Herein, the kurtosis β2 is statistics capable of assessing the distribution type of the first separation signals in the time region. When β2="0", the first separation signals in the time region show a normal distribution. In this case, it is thought that a lot of noises like environmental sounds and reverberations surrounding the target signal are included in the first separation signals. On the other hand, the larger the value of the kurtosis β2 is, the smaller the dispersion in the first separation signals in the time region becomes. In other words, it is thought that the first separation signal includes a noise component which can be easily removed therefrom.

2.2. Advantages of Signal Processing Apparatus of The Second Preferred Embodiment Thus, the signal processing apparatus 100 of the second preferred embodiment can measure the amounts nc1(*t*) and nc2(*t*) of noises included in the first separation signals by using the kurtosises of the first separation signals corresponding to the target signals. Therefore, it is possible to accurately grasp the noise condition of the first separation signal.

Further, in the measurement of the noise amounts nc1(*t*) and nc2(*t*) performed by the signal processing apparatus 100 of the second preferred embodiment, the mask processing unit 30 does not need to be involved. This eliminates the necessity of any operation (e.g., a synchronous operation) performed between the noise amount measuring unit 140 and the mask processing unit 30 and it is therefore possible to simplify the circuit configuration of the noise amount measuring unit 140 and the mask processing unit 30.

3. The Third Preferred Embodiment

Next, discussion will be made on the third preferred embodiment of the present invention. A signal processing apparatus 200 of the third preferred embodiment is the same as that of the first preferred embodiment except that the constitution of a noise amount measuring unit 240 is different from that of the first preferred embodiment. Then, the following discussion will focus on this difference. In the following discussion, the constituent elements identical to those in the signal processing apparatus 1 of the first preferred embodiment are represented by the same reference signs. In the third preferred embodiment, discussion on the constituent elements represented by the same reference signs will be omitted as it has been made in the first preferred embodiment.

3.1. Constitution of Signal Processing Apparatus

Figure 12:
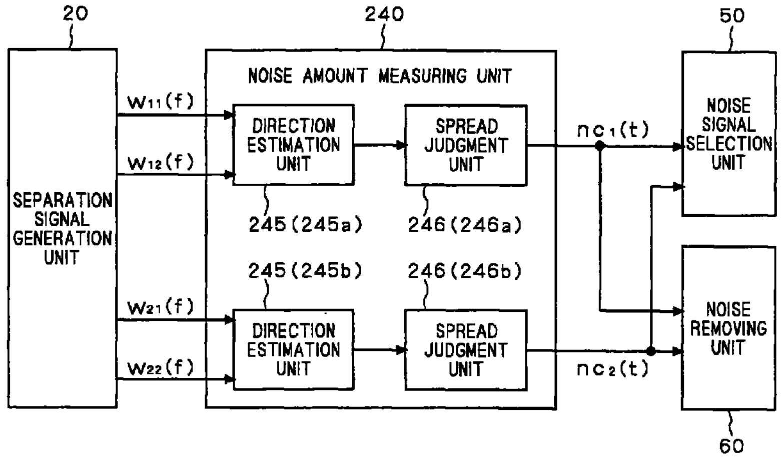
FIG. 12 is a block diagram showing an exemplary structure of a noise amount measuring unit in accordance with the third preferred embodiment.
Figure 13:
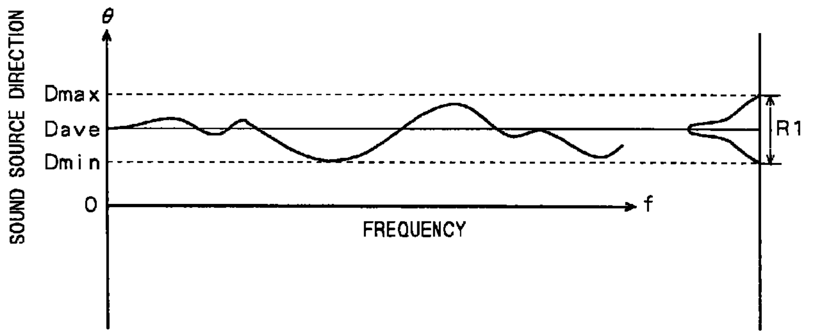
FIG. 13 is a view showing a spread condition of second separation signals.
Figure 14:
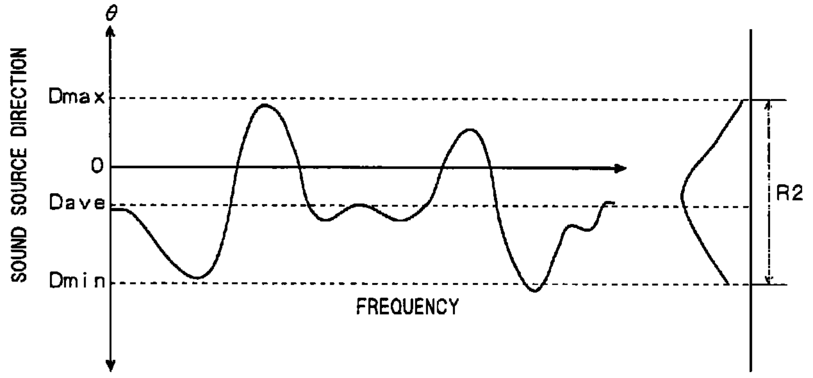
FIG. 14 is a view showing the spread condition of the second separation signals.

FIG. 12 is a block diagram showing an exemplary structure of a noise amount measuring unit 240 in accordance with the third preferred embodiment. FIGS. 13 and 14 are views each showing a spread condition of the second separation signals. The noise amount measuring unit 240 obtains the spread condition of the second separation signals out of a plurality of separation signals in the frequency region which are inputted from the separation signal generation unit 20. Then, the noise amount measuring unit 240 measures the amount of noise included in the corresponding first separation signal for each frame on the basis of the spread condition of the second separation signals. As shown in FIG. 12, the noise amount measuring unit 240 mainly has direction estimation units 245 (245*a*, 245*b*) and spread judgment units 246 (246*a*, 246*b*).

The direction estimation units 245 (245*a*, 245*b*) perform a calculation method (DOA: Direction of Arrival) called "beamforming". In the beamforming, the sound source directions of the arriving sound source signals s1(*t*) and s2(*t*) are determined by using respective delay times of the mixed sound source signals x1(*t*) and x2(*t*), which depend on the positions of the microphones 15, and the characteristics of the microphones 15.

As shown in FIG. 12, coefficients w11(*f*) and w12(*f*) out of the separation matrices are inputted to the direction estimation unit 245*a* and coefficients w21(*f*) and w22(*f*) out of the separation matrices are inputted to the direction estimation unit 245*b*.

The spread judgment units 246 (246*a*, 246*b*) use sound source direction angles calculated by the direction estimation units 245 (245*a*, 245*b*) as class and obtain histograms in which the frequencies are plotted with respect to class. Then, the spread judgment units 246 calculate the spread condition of each of the second separation signals on the basis of, e.g., (1) the standard deviation of the second separation signal, (2) angle widths R1 (see FIG. 13) and R2 (see FIG. 14) which are obtained by subtracting the minimum sound source direction angle from the maximum sound source direction angle and (3) frequencies included in a predetermined angle range (i.e., the area of the histogram in a predetermined range) and the like. In the third preferred embodiment, these spread conditions (dispersion conditions) are used as the noise amounts nc1(*t*) and nc2(*t*).

Herein, if the spread condition (e.g., the standard deviation) of the second separation signals is out of the predetermined range obtained in advance by experiment or the like, it is thought that a lot of noises like environmental sounds and reverberations surrounding the target signal are included in the first separation signal. On the other hand, if spread condition of the second separation signals falls within the predetermined range, it is thought that the first separation signal includes a noise component which can be easily removed therefrom.

3.2. Advantages of Signal Processing Apparatus of The Third Preferred Embodiment Thus, the signal processing apparatus 200 of the third preferred embodiment can measure the amounts nc1(*t*) and nc2(*t*) of noises included in the first separation signal by using the spread condition of the second separation signals with respect to the target signal. Therefore, it is possible to accurately grasp the noise condition of the first separation signal.

Further, in the measurement of the noise amounts nc1(*t*) and nc2(*t*) performed by the signal processing apparatus 200 of the third preferred embodiment, the mask processing unit 30 does not need to be involved. This eliminates the necessity of any operation (e.g., a synchronous operation) performed between the noise amount measuring unit 240 and the mask processing unit 30 and it is therefore possible to simplify the circuit configuration of the noise amount measuring unit 240 and the mask processing unit 30.

4. Variations

Though the preferred embodiments of the present invention have been discussed above, the present invention is not limited to the above-discussed preferred embodiments, but allows various variations.

(1) In the first to third preferred embodiments, though the number of sound sources (wave sources) 10 is 2, the number is not limited to this, but the number of sound sources 10 may be M ($\geqq$3). Further, though the number of microphones (observation units) 15 is 2, the number is not limited to this, but the number of observation units 15 may be M ($\geqq$3).

In this case, the mask processing unit 30 judges the noise condition on the basis of one first separation signal and (M−1)×N second separation signals and the noise signal selection unit 50 selects one out of the (M−1)×N second separation signals as the noise signal.

(2) Further, (1) In the first to third preferred embodiments, though the noise component generation units 61 (61*a*, 61*b*) of the noise removing unit 60 calculate the second noise components by multiplying the noise amounts nc1(*t*) and nc2(*t*), after being subjected to the linear transformation, by the noise signals yn1(*f, t*) and yn2(*f, t*), the calculation is not limited to this. The second noise components may be calculated, for example, by multiplying the noise amounts nc1(*t*) and nc2(*t*), not being subjected to the linear transformation, by the noise signals yn1(*f, t*) and yn2(*f, t*). The calculation cost of the noise component generation unit 61 can be thereby reduced.

While the invention has been shown and described in detail, the foregoing description is in all aspects illustrative and not restrictive. It is therefore understood that numerous modifications and variations can be devised without departing from the scope of the invention.

The invention claimed is:

1. A signal processing apparatus for reconstructing an original signal outputted from a target one of a plurality of wave sources as a target signal, comprising:

(a) a plurality of observation units for observing a plurality of original signals outputted from said plurality of wave sources as a mixed signal of the plurality of original signals;

(b) a separation signal generation unit for generating a plurality of separation signals which are independent from one another from said mixed signals for one frame, the plurality of separation signals being observed by each of said observation units and being converted into separation signals in a frequency region, for each of frequency bins in said frame;

(c) a mask processing unit for judging a noise condition of a first separation signal corresponding to said target signal out of said plurality of separation signals on the basis of said first separation signal and second separation signals, said second separation signals are said plurality of separation signals other than said first separation signal, generating a noise removal signal by removing a first noise component obtained on the basis of a judgment result on said noise condition from said first separation signal and generating a noise condition signal on the basis of said judgment result on said noise condition, for each frequency bin in said frame;

(d) a noise amount measuring unit for measuring the amount of noise included in said first separation signal for each said frame on the basis of said noise condition signal for each said frequency bin, said noise condition signal is inputted from said mask processing unit;

(e) a noise signal selection unit for selecting one of said second separation signals as a noise signal for each said frequency bin on the basis of said amount of noise measured by said noise amount measuring unit; and (f) a noise removing unit for removing a second noise component generated on the basis of said noise signal from said noise removal signal, for each said frequency bin, and outputting said noise removal signal obtained by removing said second noise component as said target signal.

2. The signal processing apparatus according to claim 1, wherein said mask processing unit judges said noise condition and generates said noise condition signal on the basis of a size comparison between an amplitude spectrum of said first separation signal corresponding to said target signal and amplitude spectra of said second separation signals, and said noise amount measuring unit measures said amount of noise by counting said noise condition signals.

3. A signal processing apparatus for reconstructing an original signal outputted from a target one of a plurality of wave sources as a target signal, comprising:

(a) a plurality of observation units for observing a plurality of original signals outputted from said plurality of wave sources as a mixed signal of the plurality of original signals;

(b) a separation signal generation unit for generating a plurality of separation signals which are independent from one another from said mixed signals for one frame, the plurality of separation signals being observed by each of said observation units and being converted into separation signals in a frequency region, for each of frequency bins in said frame;

(c) a mask processing unit for judging a noise condition of a first separation signal corresponding to said target signal out of said plurality of separation signals on the basis of said first separation signal and second separation signals, which second separation signals are said plurality of separation signals other than said first separation signals, and generating a noise removal signal by removing a first noise component obtained on the basis of a judgment result on said noise condition from said first separation signal, for each frequency bin in said frame;

(d) a noise amount measuring unit for measuring the amount of noise included in said first separation signal for each said frame on the basis of said plurality of separation signals inputted from said separation signal generation unit;

(e) a noise signal selection unit for selecting one of said second separation signals as a noise signal for each said frequency bin on the basis of said amount of noise measured by said noise amount measuring unit; and (f) a noise removing unit for removing a second noise component generated on the basis of said noise signal from said noise removal signal for each said frequency bin, and outputting said noise removal signal obtained by removing said second noise component as said target signal.

4. The signal processing apparatus according to claim 3, wherein said noise amount measuring unit converts said first separation signal in said frequency region inputted from said separation signal generation unit in a time region and measures said amount of noise included in said first separation signal on the basis of a kurtosis calculated by using said converted first separation signal.

5. The signal processing apparatus according to claim 3, wherein said noise amount measuring unit measures the amount of noise included said first separation signal for each said frame on the basis of a spread condition of said second separation signals inputted from said separation signal generation unit.

6. The signal processing apparatus according to claim 5, wherein said spread condition is a condition of dispersion in a direction of said second separation signals.

7. The signal processing apparatus according to any one of claims 1 to 5, wherein said noise removing unit generates said second noise component on the basis of said amount of noise inputted from said noise amount measuring unit and said noise signal selected by said noise signal selection unit.

8. The signal processing apparatus according to claim 1 or claim 3, wherein said noise removing unit calculates an amplitude spectrum of said target signal for each said frequency bin by subtracting an amplitude spectrum of said second noise component from an amplitude spectrum of said noise removal signal.

9. The signal processing apparatus according to claim 1 or claim 3, wherein M original signals outputted from M wave sources are each observed by N observation units (M, N: each natural number not smaller than 2), said mask processing unit judges said noise condition on the basis of one first separation signal and $(M-1)\times N$ second separation signals, and said noise signal selection unit selects one out of said $(M-1)\times N$ second separation signals as said noise signal.

* * * * *